Feb. 15, 1949.  C. A. OLCOTT  2,461,764
CONTROL MEANS FOR CENTRIFUGALS
Filed Aug. 25, 1944  3 Sheets-Sheet 2

INVENTOR.
CHARLES A. OLCOTT
BY Hugh S. Wertz
ATTORNEY

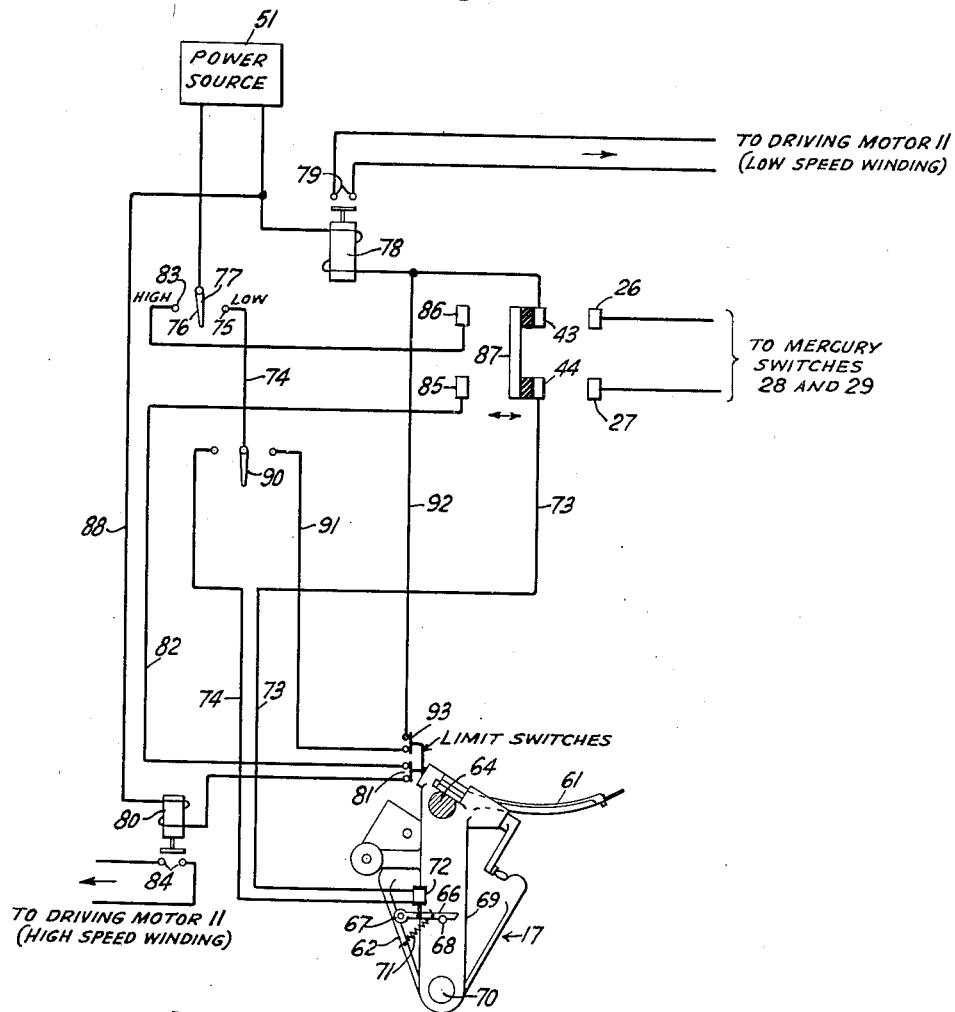
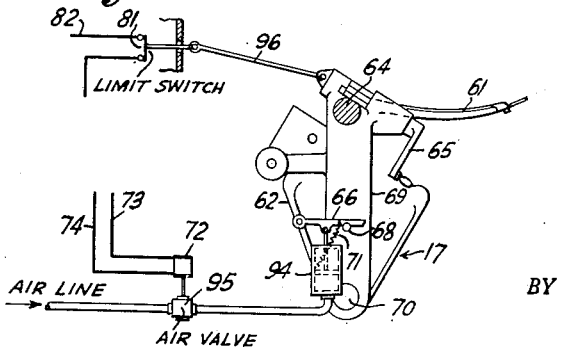

Patented Feb. 15, 1949

2,461,764

UNITED STATES PATENT OFFICE 2,461,764

CONTROL MEANS FOR CENTRIFUGALS

Charles A. Olcott, West Milford, N. J.

Application August 25, 1944, Serial No. 551,185

5 Claims. (Cl. 210—70)

This invention relates to motor control arrangements and more specifically to the control of motors at low speeds. In an important specific aspect thereof, the invention relates to the control of motors driving centrifugals when it is desired to operate them at low speeds, as, for example, during unloading.

It is an object of this invention to provide novel means for controlling the speed of a motor driving a centrifugal machine when it is operating at low speeds, as in unloading, for example.

In the operation of a sugar centrifugal, the machine is loaded at a low speed by allowing the charge consisting of sugar grains and the mother liquor to flow into the basket. The centrifugal is then brought up to its normal running speed, which in modern centrifugals is about 1800 R. P. M., and allowed to run at this speed for a few minutes. During this stage of the process, the liquids are thrown out through the perforations in the basket. After the sugar grains are sufficiently dry, the rotation of the basket is stopped or slowed down to about 40 R. P. M. and the basket is made ready to discharge its contents. The basket during the unloading stage is usually rotated at a low speed, usually 30 to 50 R. P. M., during which rotation an unloader plow is forced against the solid material in the basket to scrape the material from the sides of the basket and discharge it through openings in the bottom of the basket. A suitable unloader is shown in Patent 1,205,128 issued Nov. 14, 1916 to Edward D. Mackintosh. It is necessary that the speed be not unduly high, because, at higher speeds, the sugar will not unload. Moreover, the unloader may be broken at these higher speeds and parts thereof thrown away from the basket with sufficient force to cause considerable damage.

Heretofore manual control of the centrifugal driving means has produced generally satisfactory results but accidents have happened on occasion and with certain materials, other than the loose grain sugar with which unloaders are usually used, a low speed drive which has positive control so that the centrifugal will not run at excessive speed has been considered desirable. One such form of control previously suggested is shown in Patent 2,081,604 to Schaum, issued May 25, 1937, and comprises two or more rotating contactor rings mounted on insulating material and adapted to rotate at a speed proportional to the centrifugal driving motor, two of the rings being connected together through a mercury switch which is so mounted that at high speeds the mercury flows away from the contacts, breaking the connection, while at low speeds the mercury connects the two contacts and hence the two rings. Stationary brushes engaging the rings are connected to the motor control circuit with the result that the motor is connected while it is running slowly and is disconnected if it speeds up. The rings are usually driven by a flexible shaft attached to the bottom of the centrifugal spindle. This arrangement has a disadvantage in that the flexible shaft is in part in the path of the sugar or other materials being discharged from the basket. Furthermore, the bottom of the spindle is frequently subjected to violent movement of considerable amplitude in the event that the basket receives an unbalanced load and this movement may well occur while the machine is running at high speed. An ordinary flexible shaft does not stand up long under such severe operating conditions and it is an awkward job to crawl in under the centrifugal, frequently in a very small space, and repair or replace the flexible shaft. Another disadvantage of the arrangement just described is that the brushes are always in contact with the rings and are subject to a great deal of wear during high speed operation while the only useful work they do is performed while the machine is running at very low speed. The present invention, in one of its more important aspects, relates to the provision of improved circuit making and breaking means for controlling the speed of centrifugals during operation at low speeds, such as during unloading.

It is another object of this invention to provide an improved speed control means for centrifugal machines at low speeds which does not have the disadvantages mentioned above and which has further advantages which will be pointed out below.

In accordance with a specific embodiment of the present invention, chosen by way of example for illustrative purposes, the above-mentioned disadvantages are avoided by mounting slip rings on a split cylinder member fastened to and around the centrifugal spindle, this member holding a mercury switch tube (or two of them) at the proper angle to open by centrifugal action the circuit connected in series with its contacts at a predetermined speed, such as, for example, 40 R. P. M. This opens a motor control circuit including the slip rings, the brushes contacting the rings and the source of power so that the machine slows down, thereby allowing the mercy to close the circuit between the contacts in the mercury relay. As this opening and closing of the circuit continues, a fairly constant speed can be maintained for the unloading operation. The brushes contacting the slip rings are adapted to be moved so that they engage the slip rings when it is desired to unload the sugar but are disengaged from the rings and are connected together when the centrifugal is to operate at high speed. Thus the brushes engage the rings only when the machine is running at low speed. This not only reduces the wear on the brushes but also makes it practicable to make the rings split because the joints between the ring sections will not damage the brushes at this low speed. Another important feature of this invention is that the plow of the unloader is locked in position out of contact with the sugar during the high speed operation of the centrifugal but it is released through a circuit including the slip rings when the machine is running at a low speed. Moreover, a limit switch is provided which is normally open and which prevents high speed operation of the centrifugal except when the unloader arm is swung into the non-operating position. This avoids accidents resulting from introducing the plow while the machine is running at high speed.

The invention will be more readily understood by referring to the following description taken in connection with the accompanying drawings forming a part thereof in which:

Fig. 4 is a vertical view, partly in cross-section, of a means for controlling the position of certain of the contact members of Fig. 2;

Fig. 5 is a plan view of an unloading plow, together with circuit connections governing the operation thereof;

Fig. 6 is a modification of the arrangement of Fig. 5; and

Fig. 7 illustrates a further modification of a portion of the arrangement of Fig. 5.

Figure 1:
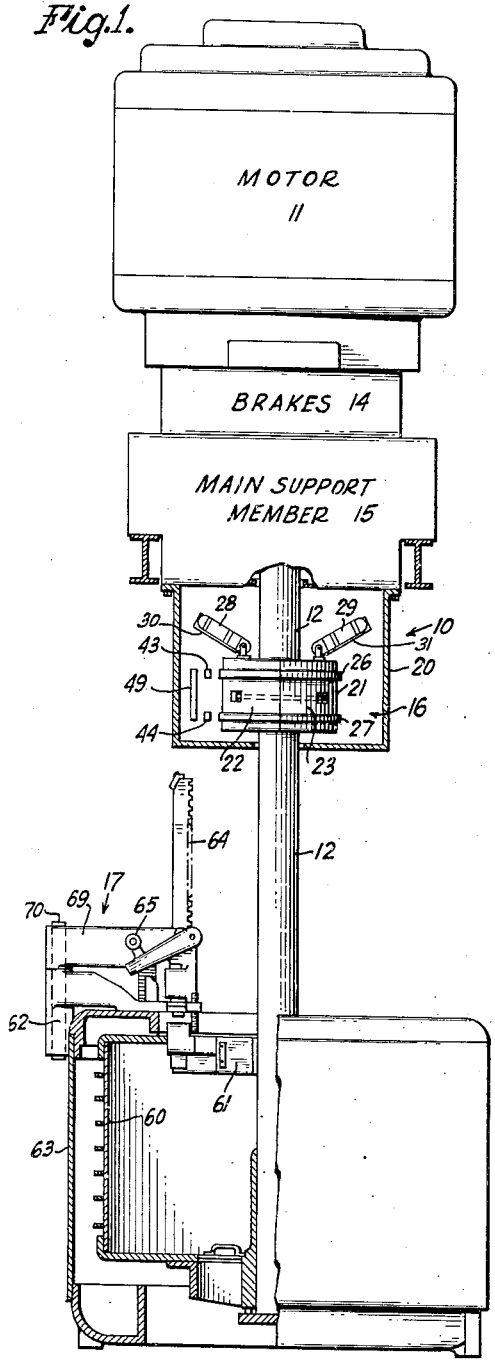
Fig. 1 is an elevation view, partly in cross-section, of a centrifugal machine embodying the invention.

Referring more particularly to the drawings, Fig. 1 shows, by way of example for purposes of illustrating the invention, a vertically mounted sugar centrifugal machine 10 embodying novel means for controlling the speed thereof during the unloading operation. The machine 10 comprises a motor 11 for driving a spindle 12 which supports at the lower end thereof a basket 60 of any well-known form. Associated with the basket 60 is an unloader 17 such as that shown in the above-identified patent to Mackintosh. The machine 10 can be stopped by brakes 14 which may be mounted above the main support member 15 which, by way of example, includes a suspension bearing and a friction clutch of the type shown in Reissue Patent 15,115 issued May 31, 1921 to E. D. Mackintosh (original Patent 1,342,405, issued June 1, 1920). In an arrangement such as that shown in the Mackintosh reissue patent, due to the slippage of the clutch, the speed of the motor is higher than that of the basket during the unloading operation. In the arrangement according to the invention, during the unloading operation, the speed of the basket 60 is controlled rather than the speed of the motor 11, which is different from the basket speed by varying amounts, thus providing a better control of the basket speed.

Figure 2:
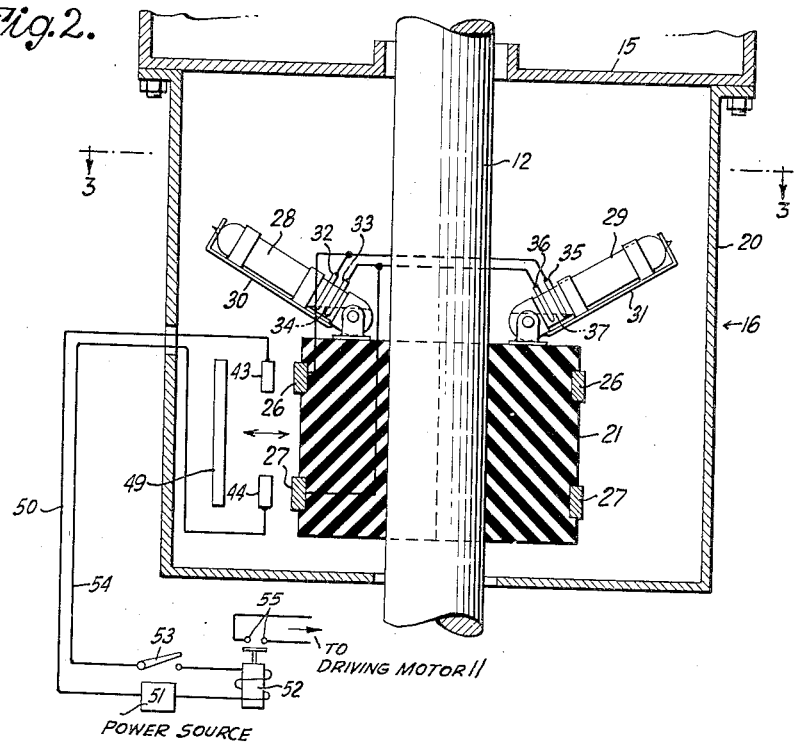
Fig. 2 is an enlarged vertical cross-sectional view of a portion of the machine of Fig. 1, showing members for controlling the speed of the centrifugal at certain low speeds, as in unloading.
Figure 3:
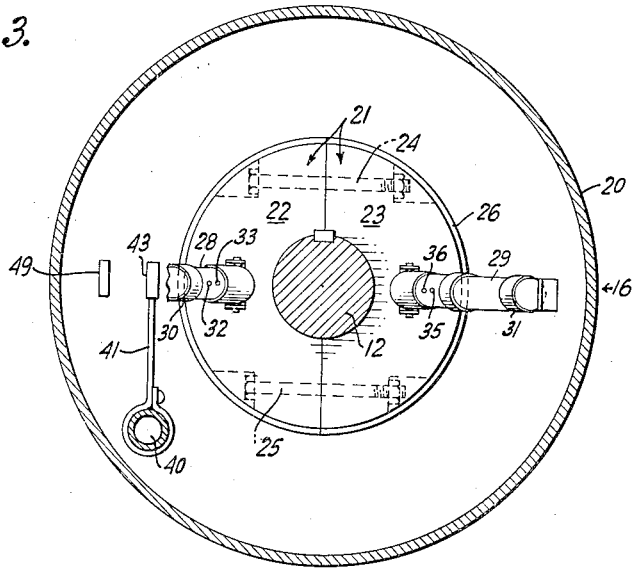
Fig. 3 is a horizontal cross-sectional view taken through the line 3—3 of Fig. 2.

In order to control the basket speed during the unloading operation, a governing assembly 16 is mounted coaxially with the spindle 12 below the support member 15. This assembly, which is drawn to larger scale in Fig. 2 and Fig. 3, comprises a housing 20, which may be secured to the main support member 15, enclosing a split-cylinder member 21 of insulating material which is keyed to the spindle 12. The two halves 22 and 23 of the member 21 are held together by any suitable means, such as by bolts 24 and 25. The cylinder 21 is provided with two slip rings 26 and 27 spaced so that they are insulated from each other by the member 21. These rings are also split so that the entire rotating assembly comprising the member 21 and the rings thereon may be removed for repair and replacement. Supported from and above the member 21 are two similar mercury switch tubes 28 and 29 mounted in support members 30 and 31 which are set at an adjustable angle with respect to the member 21. The tube 28 is provided with contact members 32 and 33 which are connected together by a pool of mercury 34 when the spindle 12 is rotating at low speeds but which are open-circuited, due to the centrifugal force acting on the mercury, when the speed of the spindle exceeds a certain speed determined by the angular position of the tube. By way of example, this angular position is set so that at all speeds above 40 R. P. M. the mercury 34 is thrown outward to such an extent that the circuit between the contact members 32 and 33 is opened. The tube 29 is provided with contact members 35 and 36 and a mercury pool 37 therein and is preferably set at the same angle as the tube 28. As the contacts 32 and 33 are connected respectively to the contacts 35 and 36, the tubes 28 and 29 are in parallel. The contacts 32 and 35 are connected to the upper ring 26, and the contacts 33 and 36 are connected to the lower ring 27. Of course, only one mercury tube is necessary if the current flow therethrough is not excessive.

Supported from and keyed to a vertical shaft 40 but insulated therefrom are two spring arms 41 and 42 (see Fig. 4) which support, respectively, brushes 43 and 44 which are adapted to make contact with corresponding slip rings 26 and 27 when the arms 41 and 42 are rotated by any suitable means, such as the handle 45. This handle is preferably provided with a latch 46 which is pushed upward by a spring 47. The latch 46 engages notches 48, one of which is shown in Fig. 4, in order to hold the brushes 43 and 44 in predetermined positions. One such position is that in which the brushes are making contact with the slip rings 26 and 27 and another such position is that in which the brushes contact a stationary contact member 49 which connects the two brushes together. In addition, one or more notches corresponding to positions between these two can be provided. In order to simplify the drawings, the handle 45 and its associated elements have not been shown in the other figures.

The brush 43 is connected to a wire 50 leading to one terminal of a source of power 51 the other terminal of which is connected through the coil of a relay 52, a hand-operated switch 53 (such as a push-button) and a wire 54 to the brush 44. When the switch 53 is closed and the brushes 43 and 44 are connected together either (1) through the slip rings 26 and 27 and the mercury switches 28 and 29 (assuming the speed of the spindle 12 is not over 40 R. P. M. and that the handle 45 is in such position that the brushes 43 and 44 contact their corresponding slip rings 26 and 27) or (2) through the stationary contact member 49 (when the handle 45 is in such position that the brushes 43 and 44 contact the member 49), the relay 52 is energized. The first of these two connections is utilized during unloading, in a manner which will be described below, and the second during normal running of the centrifugal. The operation of the relay 52 causes the contacts 55 in the motor drive circuit to be closed, causing the motor to run.

During unloading, the unloader 17 is utilized to scrape the sugar grains from the walls of the basket 60. The unloader comprises a plow 61 carried by a bracket 62 mounted on the stationary outer casing 63. The plow is lowered and lifted by means of a rack bar 64 engaged by a pinion on the shaft of the crank handle 65.

The operation of the arrangement shown in Figs. 1 to 4, inclusive, will now be described. In starting (after the mixture has been placed in the basket 60, the handle 45 is turned so as to rotate shaft 40 counterclockwise till the brushes 43 and 44 engage the stationary contact member 49 and the switch 53 is closed. This closes the circuit including the source 51, solenoid relay 52, switch 53, wire 54, brush 44, contact member 49, brush 43, and wire 50 and causes the armature of the solenoid 52 to be actuated and close the contacts 55, thus closing the circuit for applying power to the motor 11 driving the spindle 12. After the spindle has come up to its normal running speed, it is driven at this speed (approximately 1800 R. P. M., for example) for a sufficient length of time to expel the green syrup from the sugar grains. When the material is washed and then dried, the power is shut off and the brakes applied to slow or stop the machine. After the valve in the bottom of the basket has been opened to permit the discharge of the sugar, the motor (which preferably is of the two-speed type disclosed in the above-mentioned Reissue Patent 15,115 to Mackintosh) is run at its low speed, which may be half of the full speed of the motor. (The circuits for switching from high to low speed have not been shown in order to simplify the drawing. Obviously, any suitable circuits for this purpose can be used.) When the discharger or unloader plow 61 is swung by the operator into engagement with the material lining the interior of the basket, it exerts a drag upon the latter which causes the friction clutch in the main support member 15 to slip and thus holds the speed to a low value (30 to 50 R. P. M., for example). By means of the control means of this invention, the speed during unloading is kept within very narrow limits. During the unloading operation and preferably before the unloader plow has been swung into position in contact with the sugar in the basket, the handle 45 is turned to rotate the shaft 40 in a clockwise direction until the brushes 43 and 44 contact their corresponding slip rings 26 and 27. When the speed of the spindle 12 is less than 40 R. P. M., for example, the circuit including source 51, solenoid 52, switch 53, wire 54, brush 44, ring 27, contacts 33 and 36 in parallel, mercury pools 34 and 37 in parallel, contacts 32 and 35 in parallel, ring 26, brush 43 and wire 50 is closed and the contacts 55 in the driving motor circuit are also closed. If, however, due to lighter than normal pressure of the plow against the sugar grains, the speed of the spindle 12 tends to speed up, the mercury pools 34 and 37 are thrown by centrifugal force away from their corresponding contact members in the mercury switches 28 and 29 and the circuit including the solenoid 52 is opened, thus shutting off power from the driving motor 11. As soon as the spindle slows down sufficiently to permit the mercury pools 34 and 37 to once again close the circuit including the solenoid 52, the motor 11 receives power again. Thus by the means described above the speed of the basket during the unloading operation can be very accurately controlled. The speed at which the unloading operation is to take place can be adjusted by varying the angle of the mercury switches 28 and 29. After the centrifugal is unloaded, it may be loaded again for another drying cycle, the handle 45 being rotated counterclockwise until the brushes 43 and 44 contact the stationary contact member 49. By means of this arrangement for shifting the position of the brushes 43 and 44, they receive very little wear as they are only in contact with the rings 26 and 27 during the unloading operation. This arrangement also makes possible the splitting of the rings 26 and 27 and the cylinder 21 as the brushes contact the rings only at low speeds.

Fig. 5 shows an extension and a modification of the arrangement shown in the previously described figures. Fig. 5 is a plan view of the unloader 17 of Fig. 1 to which has been added novel means linking its operation with that of the speed control means. More complete circuit connections for two-speed motor control are also shown in Fig. 5. A latch 66 has been added to the unloader (shown in Fig. 1 and in Mackintosh Patent 1,205,128) which can turn on pivot 67 and which engages a projection or pin 68 carried by the movable arm 69 pivoting on pivot or stud 70. Any suitable means, such as the spring 71 connected between the latch 66 and the bracket 62, for example, can be provided for holding the latch in place, in the absence of a force opposing the spring or other means, so that the unloader arm 69 cannot be moved from its nonoperating position (the position shown in Fig. 5) towards the right to the operating position where the plow 61 engages the sugar in the basket 60. Placed so as to move the latch 66 from the projection 68 when it is energized is a solenoid 72 the coil of which has two wires 73 and 74 connected thereto. The other end of the wire 73 is connected to brush 44 while the other end of the wire 74 is connected to the right-hand or low speed contact element 75 of a switch 76. The movable switch arm 77 of this switch is connected to one terminal of the power source 51 which may also serve as the source of power for the driving motor 11 through suitable connections (not shown). The other terminal of the source 51 is connected through a solenoid relay 78 to the brush 43. The contacts 79, closed by operation of the relay 78, close the circuit from the power source to the low speed winding of the two-speed motor 11. The terminal of the source 51 which is connected to the solenoid 78 (or another terminal if a three-wire source is used) is connected through wire 88, the coil of a solenoid relay 80, limit switch 81, and wire 82 to a stationary contact member 85. Stationary contact member 86, which forms with the member 85 a pair which is bridged by movable contact member 87 which is insulated from the brushes 43 and 44 but is intended to be moved therewith, is connected to the left-hand or high speed contact 83 of switch 76. The contacts 84 of the relay 80 are in circuit with the high speed winding of the motor 11.

The operation of the arrangement shown in Fig. 5 will now be described. After the basket 60 is loaded, the switch arm 77 is connected to the high speed contact 83 and the brushes 43 and 44 are moved to the left until movable contact member 87 connects together stationary contact members 85 and 86. A circuit is thus completed from the power source 51 through switch arm 77, contact members 83, 86, 87 and 85, wire 82, limit switch 81, relay coil 89, and wire 88 back to the source 51. The operation of the relay 80 closes the contacts 84 and the connection to the high speed winding of the motor 11 is completed and it thereby starts up, rotating the basket 60. Because the brushes 43 and 44 are moved to their left-hand position, it makes no difference whether or not the slip rings 26 and 27 are connected together through the mercury switches 28 and 29 and hence the speed of the basket can greatly exceed the setting of these switches (30 to 50 R. P. M.) and in fact reaches normal running speed (for example, it may reach approximately 1800 R. P. M.). As the solenoid 72 is not energized during this time, the plow 61 cannot be moved into position against the sugar in the basket 60 as the spring 71 causes the latch 66 to engage the pin 68. As the plow 61 is locked in the non-operating position shown in Fig. 5 during high speed operation, accidents resulting from introducing the plow while the machine is running at high speed are prevented. If the plow is not in this non-operating position, the limit switch 81 will be opened, preventing the closing of the high speed circuit. After the basket 60 has been rotated at high speed for a sufficient length of time to drive off the mother liquor and then wash and dry the sugar, the basket is ready for the unloading operation. The machine is stopped or slowed by cutting off all power, meanwhile applying the brakes, and then after the valve in the bottom has been opened, it is started up again for the unloading at low speed. This last is accomplished by connecting switch arm 77 to the contact 75 and moving the brushes 43 and 44 to the right. This completes a circuit from the source 51 through the switch arm 77, contact 75, wire 74, solenoid 72, wire 73, brush 44, ring 27, switches 28 and 29 (as in the arrangement of Fig. 1), ring 26, brush 43, and relay 78 back to the source 51. This energizes relay 78 and closes the contacts 79 in the circuit to the low speed winding of the motor 11. The energization of the solenoid relay 72 releases latch 66 from the pin 68 so the plow 61 can be moved (to the right) to its unloading or operating position to scrape out the sugar from the basket 60. The operation of the brushes 43 and 44, the rings 26 and 27 and the mercury switches 28 and 29 to control the speed during the unloading operation is similar to that of the corresponding members in the arrangement of Figs. 1 to 4. If it is desired to run the machine at low speed with the plow in the non-operating position and not under control of the mercury switches, additional circuit means can be provided, such as, for example, the switch 90 and lines 91 and 92 (shown in Fig. 6) for shorting the mercury switches and relay 72 when the switch 90 is thrown to the right-hand position (in the left-hand position of this switch the circuit is the same as in Fig. 5). Safety requires that an additional limit switch 93 similar to the switch 81 be provided which would prevent such operation unless the unloader were in its non-operating position. Except for these differences, Fig. 6 is like Fig. 5. The limit switch 81 and any similar switch 93 are preferably so set that they do not close until the unloader is moved far enough in the non-operating position for latch 66 to engage pin 68. In actual practice, the latch 66 is preferably so concealed that it cannot easily be disengaged manually by the centrifugal operator.

It will be apparent that in the arrangement described, the unloader cannot be engaged while the centrifugal is rotating at any speed above the predetermined safe speed for unloading nor can the centrifugal be caused to rotate above the predetermined safe unloading speed except when the unloader is latched in its non-operating position.

While for the sake of simplicity, the latch 66 has been shown as directly connected to the armature of the solenoid 72, in practice it may be preferable to have the latch operated by an air piston 94 and have the solenoid operate an air valve 95 (see Fig. 7). This makes it unnecessary to bring electric wires near the unloader which is usually wet. Moreover, the limit switch may be moved away from the unloader and operated by a link 96 therefrom (also see Fig. 7). Any other known circuit connection for the solenoid 72 and the relay 78 may be used instead of the series arrangement shown.

It will be apparent that a similar speed control arrangement to that described above may be used during the loading operation, other rings, brushes and mercury switches (preferably set for a higher speed) being provided. If desired, one ring and brush can be used for both loading and unloading in the manner shown in Patent 2,081,604 issued May 25, 1937 to F. Schaum.

Various other changes may be made in the described arrangements without departing from the spirit of the invention, the scope of which is indicated by the claims.

What is claimed is:

1. A sugar centrifugal machine comprising a rotatable spindle, a basket for sugar to be dried carried by said spindle, means for rotating the basket at high speed to dry the sugar, means for rotating said basket at low speed during the unloading operation, a scraper for plowing the dried sugar out of said basket, manually-operated means for moving the scraper to its operating position within the basket and for retracting it to a non-operating position outside the basket, means for locking the scraper in said non-operating position, and safety mechanism interlocking the movement of said rotating means and the movement of said scraper comprising (1) means connected to said high speed driving means and adapted to be operated by the scraper in its movement into the basket for disengaging the high speed driving means and (2) means connected to said low speed driving means and to said locking means to release said locking means when the low speed driving means is energized.

2. A sugar centrifugal machine comprising a rotatable spindle, a basket for sugar to be dried carried by said spindle, means for rotating the basket at high speed to dry the sugar, means for rotating said basket at low speed during the unloading operation, a scraper for plowing the dried sugar out of said basket, manually-operated means for moving the scraper to its operating position within the basket and for retracting it to a non-operating position outside the basket, means for locking the scraper in said non-operating position, and safety mechanism interlocking the movement of said rotating means and the movement of said scraper comprising (1) means connected to said high speed driving means and adapted to be operated by the scraper in its movement into the basket for disengaging the high speed driving means and (2) means connected to said low speed driving means and to said locking means to release said locking means when the low speed driving means is energized, said low speed driving means including means responsive to the speed of the centrifugal for breaking said low speed driving connection when the speed of said centrifugal exceeds a predetermined speed.

3. The combination of elements as in claim 2, in which said low speed driving means includes a source of power and electric circuit elements, including said speed responsive means, in circuit with said source, in further combination with a circuit in shunt to said speed responsive means for rendering ineffective said speed responsive means.

4. The combination of elements as in claim 1, in which said low speed driving means includes a source of power and electric circuit elements, including a solenoid for controlling said locking means, in circuit with said source.

5. The combination of elements as in claim 1, in which said low speed driving means includes a source of power and electric circuit elements, including a solenoid for controlling said locking means, in circuit with said source, in further combination with an air piston connected to said locking means, a source of air pressure, an air line connected between said source and said piston, and an air valve in said line and operated by said solenoid.

CHARLES A. OLCOTT.

REFERENCES CITED

The following references are of record in the file of this patent:

UNITED STATES PATENTS

| Number | Name | Date |
| --- | --- | --- |
| Re. 15,115 | Mackintosh | May 31, 1921 |
| 1,137,908 | Rumold | May 4, 1915 |
| 1,205,128 | Mackintosh | Nov. 14, 1916 |
| 1,532,851 | Zuccarello | Apr. 7, 1925 |
| 1,536,915 | Olcott | May 5, 1925 |
| 2,077,053 | Neuman | Apr. 13, 1937 |
| 2,081,604 | Schaum | May 25, 1937 |
| 2,119,644 | Miller | June 7, 1938 |
| 2,216,501 | Renaud | Oct. 1, 1940 |